(12) United States Patent
Groters

(10) Patent No.: US 11,155,012 B2
(45) Date of Patent: *Oct. 26, 2021

(54) METHOD OF MANUFACTURING A SEAL ASSEMBLY FOR A VEHICLE

(71) Applicant: Henniges Automotive Sealing Systems North America, Inc., Wilmington, DE (US)

(72) Inventor: Thomas Groters, Waterford, MI (US)

(73) Assignee: Henniges Automotive Sealing Systems North America, Inc., Wilmington, DE (US)

(*) Notice: Subject to any disclaimer, the term of this patent is extended or adjusted under 35 U.S.C. 154(b) by 467 days.

This patent is subject to a terminal disclaimer.

(21) Appl. No.: 16/073,101

(22) PCT Filed: Jan. 26, 2017

(86) PCT No.: PCT/US2017/015137
§ 371 (c)(1),
(2) Date: Jul. 26, 2018

(87) PCT Pub. No.: WO2017/132382
PCT Pub. Date: Aug. 3, 2017

(65) Prior Publication Data
US 2019/0061214 A1    Feb. 28, 2019

Related U.S. Application Data

(60) Provisional application No. 62/287,163, filed on Jan. 26, 2016.

(51) Int. Cl.
*B29C 45/14* (2006.01)
*B60J 10/21* (2016.01)
(Continued)

(52) U.S. Cl.
CPC .. *B29C 45/14409* (2013.01); *B29C 45/14377* (2013.01); *B29C 45/14467* (2013.01);
(Continued)

(58) Field of Classification Search
CPC ........ B29C 45/14409; B29C 45/14377; B29C 45/14467; B29C 2045/14139;
(Continued)

(56) References Cited

U.S. PATENT DOCUMENTS 2,571,259 A    10/1951   Kusiak
2,579,072 A    12/1951   Harris
(Continued)

FOREIGN PATENT DOCUMENTS

CN    1293121 A    5/2001
CN    1636697 A    7/2005
(Continued)

OTHER PUBLICATIONS

English language abstract for CN 106476297 A extracted from espacenet.com database on Sep. 14, 2020, 2 pages.
(Continued)

*Primary Examiner* — Robert J Grun
(74) *Attorney, Agent, or Firm* — Howard & Howard Attorneys PLLC

(57) ABSTRACT

In a method of manufacturing a seal assembly, strips of material are extruded to form first and second bodies, and ends of the bodies are positioned into a mold cavity of a molding apparatus. An elastomeric material is injected into the mold cavity to form a locator device having a foot portion and a tab portion with the tab portion defining a first reference point. A thermoplastic elastomeric material is injected into the mold cavity to form a corner mold covering the body ends and the foot portion of the locator device with the corner mold defining a second reference point. The
(Continued)

corner mold bonds the first body end, the second body end, and the locator device together to fix the locator device to the first body end at a locator position such that a predetermined distance between the reference points is maintained during injecting of the thermoplastic elastomeric material.

17 Claims, 8 Drawing Sheets

(51) Int. Cl.
| | | |
|---|---|---|
| *B60J 10/78* | (2016.01) | |
| *B60J 10/00* | (2016.01) | |
| *B60J 10/36* | (2016.01) | |
| B29L 31/26 | (2006.01) | |
| B29K 21/00 | (2006.01) | |
| B60R 13/04 | (2006.01) | |

(52) U.S. Cl.
CPC .............. *B60J 10/00* (2013.01); *B60J 10/21* (2016.02); *B60J 10/36* (2016.02); *B60J 10/78* (2016.02); *B29C 2045/14139* (2013.01); *B29C 2045/14254* (2013.01); *B29C 2045/14459* (2013.01); *B29K 2021/003* (2013.01); *B29L 2031/26* (2013.01); *B60R 13/04* (2013.01)

(58) Field of Classification Search
CPC .. B29C 2045/14254; B29C 2045/14459; B60J 10/00; B60J 10/36; B60J 10/21; B60J 10/78; B29K 2021/003; B60R 13/04; B29L 2031/26
See application file for complete search history.

(56) References Cited

U.S. PATENT DOCUMENTS

| | | | |
|---|---|---|---|
| 2,637,073 | A | 5/1953 | Walther |
| 4,834,931 | A | 5/1989 | Weaver |
| 4,861,540 | A | 8/1989 | Nieboer et al. |
| 5,092,078 | A | 3/1992 | Keys |
| 5,139,307 | A | 8/1992 | Koops et al. |
| 5,155,938 | A | 10/1992 | Nozaki |
| 5,433,038 | A | 7/1995 | Dupuy |
| 5,451,090 | A | 9/1995 | Brodie et al. |
| 5,505,602 | A | 4/1996 | Sumi |
| 5,702,148 | A | 12/1997 | Vaughan et al. |
| 5,779,956 | A | 7/1998 | Hollingshead et al. |
| 5,846,463 | A | 12/1998 | Keeney et al. |
| 6,802,666 | B1 | 10/2004 | Bormann et al. |
| 7,010,886 | B2 | 3/2006 | Deguchi et al. |
| 7,114,221 | B2 | 10/2006 | Gibbons et al. |
| 7,152,374 | B2 | 12/2006 | Gopalan |
| 7,320,199 | B2 | 1/2008 | Ueda et al. |
| 7,350,849 | B2 | 4/2008 | Roush et al. |
| 7,425,032 | B2 | 9/2008 | Morikawa et al. |
| 7,582,243 | B2 | 9/2009 | Kubo et al. |
| 7,837,257 | B2 | 11/2010 | Kuntze et al. |
| 8,123,995 | B2 | 2/2012 | Tamura |
| 8,127,501 | B2 | 3/2012 | Nakao et al. |
| 8,371,069 | B2 | 2/2013 | O'Sullivan et al. |
| 8,414,063 | B2 | 4/2013 | Watson et al. |
| 8,561,353 | B2 | 10/2013 | Terai et al. |
| 8,640,385 | B2 | 2/2014 | Sawatani et al. |
| 8,667,738 | B2 | 3/2014 | Kondo et al. |
| 8,801,070 | B2 | 8/2014 | Takeuchi et al. |
| 9,022,446 | B2 | 5/2015 | Zimmer et al. |
| 9,085,219 | B2 | 7/2015 | Wade et al. |
| 9,114,765 | B1 | 8/2015 | James et al. |
| 9,234,540 | B2 | 1/2016 | Bachelder et al. |
| 9,290,083 | B2 | 3/2016 | Mass et al. |
| 9,614,705 | B2 | 4/2017 | Jeng et al. |
| 9,783,134 | B2 | 10/2017 | Mori et al. |
| 9,809,097 | B1 | 11/2017 | Metcalf et al. |
| 9,834,071 | B2 | 12/2017 | Alhof |
| 10,029,544 | B2 | 7/2018 | Kramar et al. |
| 10,723,050 | B2 * | 7/2020 | Thomson .......... B29C 45/14065 |
| 2004/0031203 | A1 | 2/2004 | Russell et al. |
| 2004/0161584 | A1 | 8/2004 | Aritake et al. |
| 2004/0250474 | A1 | 12/2004 | Kubo et al. |
| 2005/0229495 | A1 | 10/2005 | Murase et al. |
| 2005/0269741 | A1 | 12/2005 | Rigby et al. |
| 2006/0073727 | A1 | 4/2006 | Kimura et al. |
| 2006/0107601 | A1 | 5/2006 | Inagaki et al. |
| 2007/0077394 | A1 | 4/2007 | Kubo et al. |
| 2007/0101656 | A1 | 5/2007 | Stipp |
| 2007/0175102 | A1 | 8/2007 | Teramoto et al. |
| 2007/0194539 | A1 | 8/2007 | Titz et al. |
| 2008/0182046 | A1 | 7/2008 | Brambrink et al. |
| 2008/0238134 | A1 | 10/2008 | Guellec |
| 2012/0144751 | A1 | 6/2012 | Schapitz |
| 2013/0341961 | A1 | 12/2013 | Mori et al. |
| 2014/0059940 | A1 | 3/2014 | Eguchi |
| 2015/0165880 | A1 | 6/2015 | Mass et al. |
| 2016/0075062 | A1 | 3/2016 | DeVlieger |
| 2016/0076164 | A1 | 3/2016 | DeVlieger |
| 2017/0008567 | A1 | 1/2017 | Kim |
| 2017/0057136 | A1 | 3/2017 | Fukuda et al. |
| 2018/0001748 | A1 | 1/2018 | Kramar et al. |
| 2018/0065284 | A1 | 3/2018 | Sutter |
| 2019/0061214 | A1 | 2/2019 | Groters |
| 2019/0160716 | A1 | 5/2019 | Thomson et al. |

FOREIGN PATENT DOCUMENTS

| | | |
|---|---|---|
| CN | 101068681 A | 11/2007 |
| CN | 101554764 A | 10/2009 |
| CN | 102529650 A | 7/2012 |
| CN | 103978871 A | 8/2014 |
| CN | 106476297 A | 3/2017 |
| DE | 19543819 A1 | 8/1996 |
| DE | 10159251 C1 | 4/2003 |
| DE | 102010001468 A1 | 8/2011 |
| DE | 102015210901 A1 | 12/2016 |
| EP | 1642696 A1 | 4/2006 |
| EP | 3093115 A1 | 11/2016 |
| EP | 3093116 A1 | 11/2016 |
| FR | 2959785 A1 | 11/2011 |
| JP | H06156157 A | 6/1994 |
| JP | H0872100 A | 3/1996 |
| JP | 2000351134 A | 12/2000 |
| JP | 2005041481 A | 2/2005 |
| JP | 2005075034 A | 3/2005 |
| JP | 2006248409 A | 9/2006 |
| JP | 2013116679 A | 6/2013 |
| JP | 6065798 B2 | 1/2017 |
| WO | 2016040761 A1 | 3/2016 |
| WO | 2016040845 A1 | 3/2016 |
| WO | 2017075025 A1 | 5/2017 |
| WO | 2017075028 A1 | 5/2017 |

OTHER PUBLICATIONS

English language abstract for JP 2000-351134 A A extracted from espacenet.com database on Sep. 14, 2020, 1 page.
Chinese Search Report for Application CN 2018113272163 dated Sep. 1, 2020, 2 pages.
English language abstract for JPH08-72100 extracted from espacenet.com database on Jun. 5, 2019, 2 pages.
European Search Report for Application EP 17 74 4895 dated May 21, 2019, 3 pages.
European Search Report for Application EP 16 86 0667 dated Mar. 11, 2019, 2 pages.
International Search Report for Application No. PCT/US2016/058826 dated Jan. 3, 2017, 1 page.
International Search Report for Application No. PCT/US2026/058820 dated Jan. 23, 2017, 1 page.
International Search Report for Application No. PCT/US2017/015137 dated Apr. 4, 2017, 1 page.
U.S. Appl. No. 15/770,268, filed Apr. 23, 2018 (corresponding

(56) References Cited

OTHER PUBLICATIONS

International Publication No. WO2017/075025A1 listed as Foreign Patent Document No. 14 and submitted herein).
U.S. Appl. No. 15/826,010, filed Nov. 29, 2017, 48 pages.
U.S. Appl. No. 62/246,375, filed Oct. 26, 2015, 15 pages.
U.S. Appl. No. 62/246,382, filed Oct. 26, 2015, 20 pages.
U.S. Appl. No. 62/287,163, filed Jan. 26, 2016, 14 pages.
English language abstract for DE19543819A1 extracted from espacenet.com database on Apr. 19, 2018, 1 page.
English language abstract for DE10159251C1 extracted from espacenet.com database on Apr. 19, 2018, 1 page.
English language abstract for DE102010001468A1 extracted from espacenet.com database on Apr. 19, 2018, 2 pages.
Computer generated English language abstract for DE102015210901A1 extracted from espacenet.com database on Apr. 19, 2018, 2 pages.
English language abstract for EP3093115A1 extracted from espacenet.com database on Apr. 19, 2018, 2 pages.
Computer-generated English language abstract for EP3093116 extracted from espacenet.com database on Apr. 19, 2018, 3 pages.
English language abstract for JPH06156157A extracted from espacenet.com database on Apr. 18, 2018, 1 page.
English language abstract for FR2959785A1 extracted from espacenet.com database on Jul. 5, 2018, 2 pages.
English language abstract for JP2013116679A extracted from espacenet.com database on Jul. 5, 2018, 1 page.
English language abstract for JP6065798B2 extracted from espacenet.com database on Jul. 5, 2018, 1 page.
Chinese Search Report for Application CN 201780008247X dated Sep. 27, 2020, 1 page.
English language abstract for CN 1293121 A extracted from espacenet.com database on Oct. 1, 2020, 1 page.
English language abstract for CN 1636697 A extracted from espacenet.com database on Oct. 29, 2020, 1 page.
English language abstract for CN 101068681 A A extracted from espacenet.com database on Oct. 29, 2020, 2 pages.
English language abstract for CN 101554764 A extracted from espacenet.com database on Oct. 29, 2020, 2 pages.
English language abstract for CN 102529650 A extracted from espacenet.com database on Oct. 29, 2020, 2 pages.
English language abstract for CN 103978871 A extracted from espacenet.com database on Oct. 29, 2020, 1 page.
English language abstract for JP 2005-041481 A extracted from espacenet.com database on Oct. 29, 2020, 1 page.
English language abstract for JP 2005-075934 A extracted from espacenet.com database on Oct. 29, 2020, 1 page.
English language abstract for JP 2006-248409 A extracted from espacenet.com database on Oct. 29, 2020, 1 page.
Chinese Search Report for Application CN 20168006256.2 dated Oct. 23, 2020, 2 pages.

* cited by examiner

METHOD OF MANUFACTURING A SEAL ASSEMBLY FOR A VEHICLE

CROSS REFERENCE TO RELATED APPLICATIONS

The subject application is the National Stage of International Patent Application No. PCT/US2017/015137 filed on Jan. 26, 2017, which claims priority to and all of the benefits of U.S. Provisional Application Ser. No. 62/287,163 filed on Jan. 26, 2016, the contents of which are expressly incorporated herein in their entirety.

FIELD OF THE INVENTION

The present disclosure relates generally to seal assemblies and, more particularly, to a method of manufacturing a seal assembly for a vehicle.

BACKGROUND

Automotive passenger vehicles commonly have at least one door defining a window frame for receiving and/or supporting a window pane. Typically, a seal assembly is disposed on the window frame to seal an interface between the window frame and the window pane, as well as to seal the interface between the door and a vehicle body. Decorative appliqués are often mounted to the door about the seal assembly to provide an aesthetically pleasing appearance. During the manufacture of the seal assembly, slight dimensional variations of the individual components of the seal assembly can cause undesirable tolerance stack-up, which can then cause a misalignment between the appliqué and seal assembly. The present disclosure is aimed at solving this issue.

SUMMARY

A method of manufacturing a seal assembly is disclosed. The method utilizes a molding apparatus defining a mold cavity. The method includes the steps of: extruding a first strip of material to form a first body having opposing first body ends; extruding a second strip of material to form a second body having opposing second body ends; positioning one of the first body ends and one of the second body ends into the mold cavity of the molding apparatus with the first body end positioned adjacent the second body end and defining a first reference point on at least one of the first and second body ends; injecting an elastomeric material into the mold cavity to form a locator device having a foot portion and a tab portion extending from the foot portion with the tab portion defining a second reference point and with the foot portion of the locator device positioned adjacent the first body end; and injecting a thermoplastic elastomeric material into the mold cavity to form a corner mold covering the first body end, the second body end, and the foot portion of the locator device to bond the first body end, the second body end, and the locator device together and to fix the foot portion of the locator device to the first body end at a locator position such that a predetermined distance between the first and second reference points is maintained during the injecting of the thermoplastic elastomeric material.

BRIEF DESCRIPTION OF THE DRAWINGS

The advantages of the present disclosure will be readily appreciated as the same becomes better understood by reference to the following detailed description when considered in connection with the accompanying drawings. It is to be understood that the drawings are purely illustrative and are not necessarily drawn to scale.

DETAILED DESCRIPTION

Referring now to the figures, wherein like numerals indicate corresponding parts throughout the several views, embodiments of a method of manufacturing a seal assembly 100 for a vehicle 10 is described in detail below. The seal assembly 100 is adapted for use with automotive passenger vehicles. It is to be appreciated that the seal assembly 100 may also be adapted for use with other types of vehicles, such as trucks, trains, airplanes, boats/ships, military vehicles, and/or the like.

Figure 1:
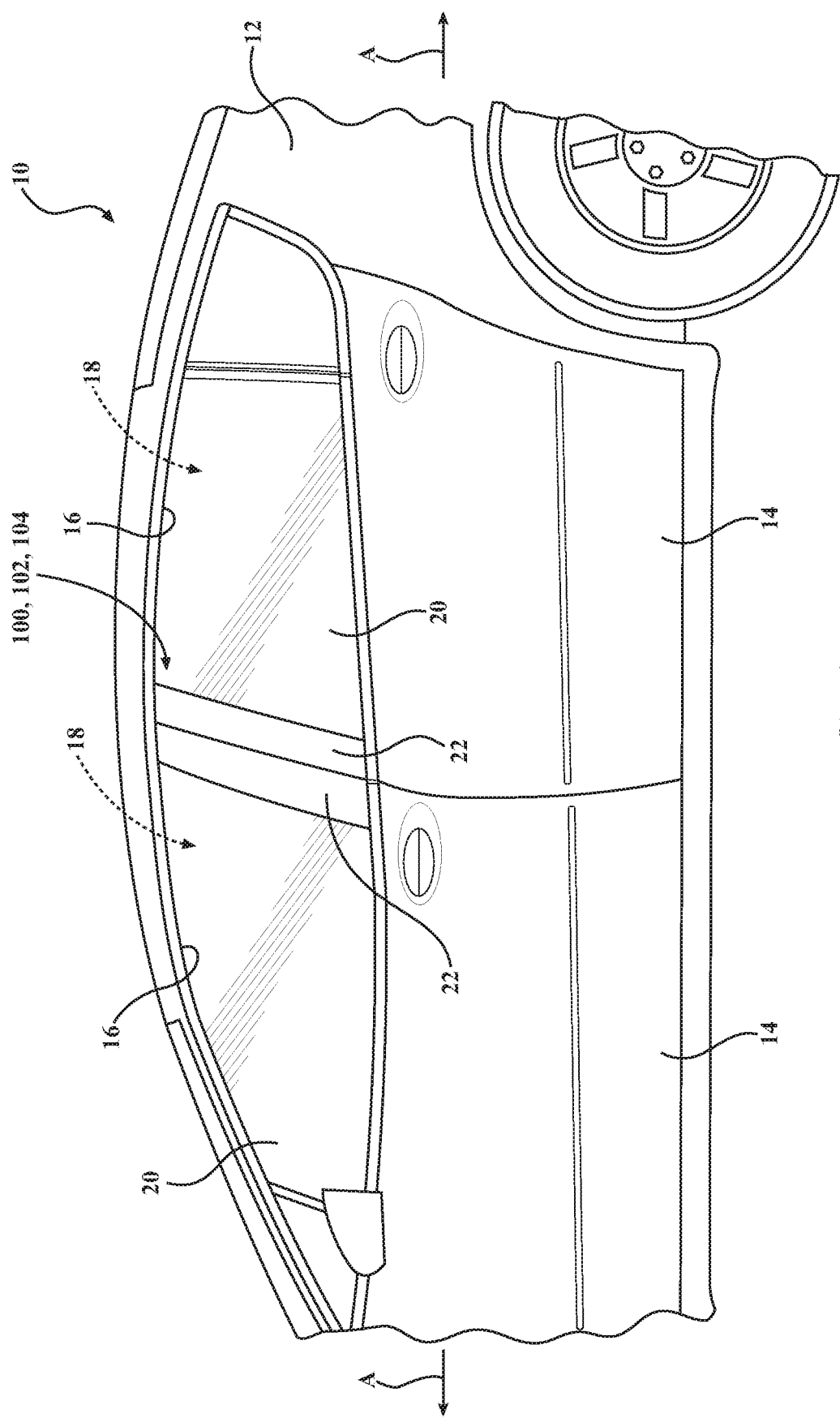
FIG. 1 is a side view of a portion of an exterior of a vehicle having a seal assembly and one or more appliqués.

FIG. 1 illustrates a portion of an exterior of an automotive passenger vehicle 10. The vehicle 10 includes a vehicle body 12 and a plurality of doors 14 (such as a driver-side door and at least one passenger door) coupled to the vehicle body 12. Each of the vehicle doors 14 has a window frame 16 defining a window opening 18, and the window frame 16 supports a window closure member 20 such as a glass window pane. In an example, the window closure member 20 is moveable between an opened position (where at least a portion of the window opening 18 is exposed) and a closed position (where the entire window opening 18 is covered). The vehicle 10 further includes various decorative components, such as appliqués 22 or other decorative trim pieces mounted to the vehicle 10. In one particular example, the attachment feature is a b-pillar appliqué 22 mounted to the vehicle 10 between the window frames 16 defined in front and rear doors 14 of the passenger vehicle 10.

Figure 2:
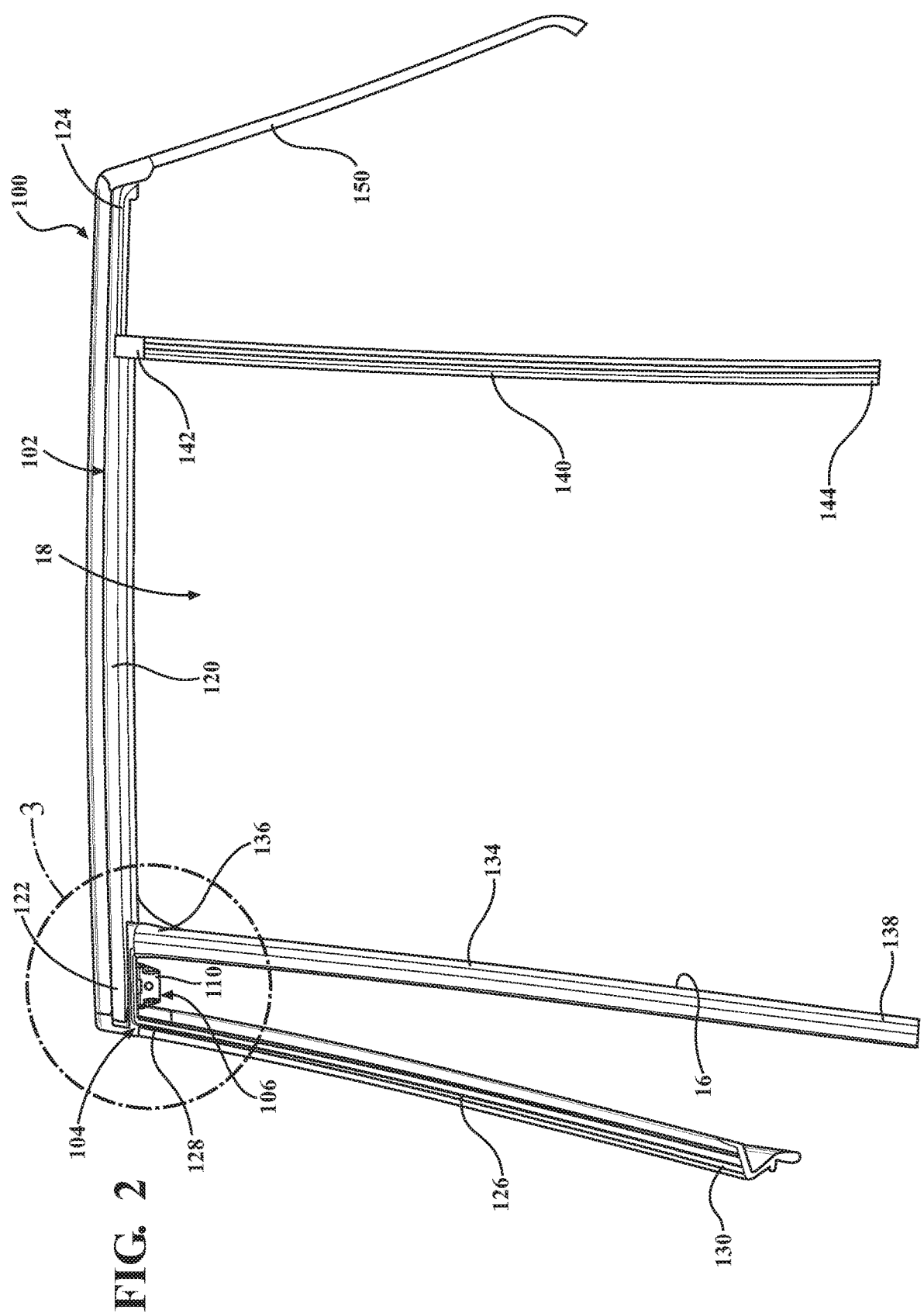
FIG. 2 is a front-side view of the seal assembly according to an embodiment of the present disclosure.

Details of the seal assembly 100 formed by the method of the present disclosure are described with reference to FIGS. 2-6. The seal assembly 100 includes a window seal portion 102 adapted to be coupled to the vehicle door 14 and extend at least partially along the window frame 16. The seal assembly 100 shown in FIG. 2 is configured to be coupled to the rear door 14 of the vehicle 10. It is to be appreciated that the door configuration in FIG. 1 is somewhat schematic and it is to be understood that the configuration of the seal assembly 100 can change depending on where the seal assembly 100 is applied on the vehicle 10 and the specific door configuration. The window seal portion 102 receives the window closure member 20 as the window closure member 20 moves toward the closed position. When the window seal portion 102 receives the window closure member 20, the window seal portion 102 seals an interface between the window frame 16 and the window closure member 20.

The seal assembly 100 further includes an appliqué attachment portion 104, which is also adapted to be coupled to the vehicle door 14. As shown, the appliqué attachment portion 104 includes a locator device 106, which operates to align the appliqué 22 with the seal assembly 100. The locator device 106 also operates to secure the appliqué 22 to the seal assembly 100, which in turn secures the appliqué 22 to the vehicle door 14. In addition to the above, the locator device 106 operates to align the attachment portion 104 on the vehicle door 14 and to align the window seal portion 102 within the window frame 16 during installation, such that the appliqué attachment portion 104 can be properly positioned on the door 14, and the window seal portion 102 can be properly positioned within the window frame 16.

The locator device 106 is a unitary, one-piece component formed of a suitable elastomeric material. In an embodiment, the elastomeric material is chosen from any suitable hard elastomer. In a non-limiting example, the elastomeric material is a thermoplastic elastomer, such as polypropylene and high-density polyethylene.

Figure 6:
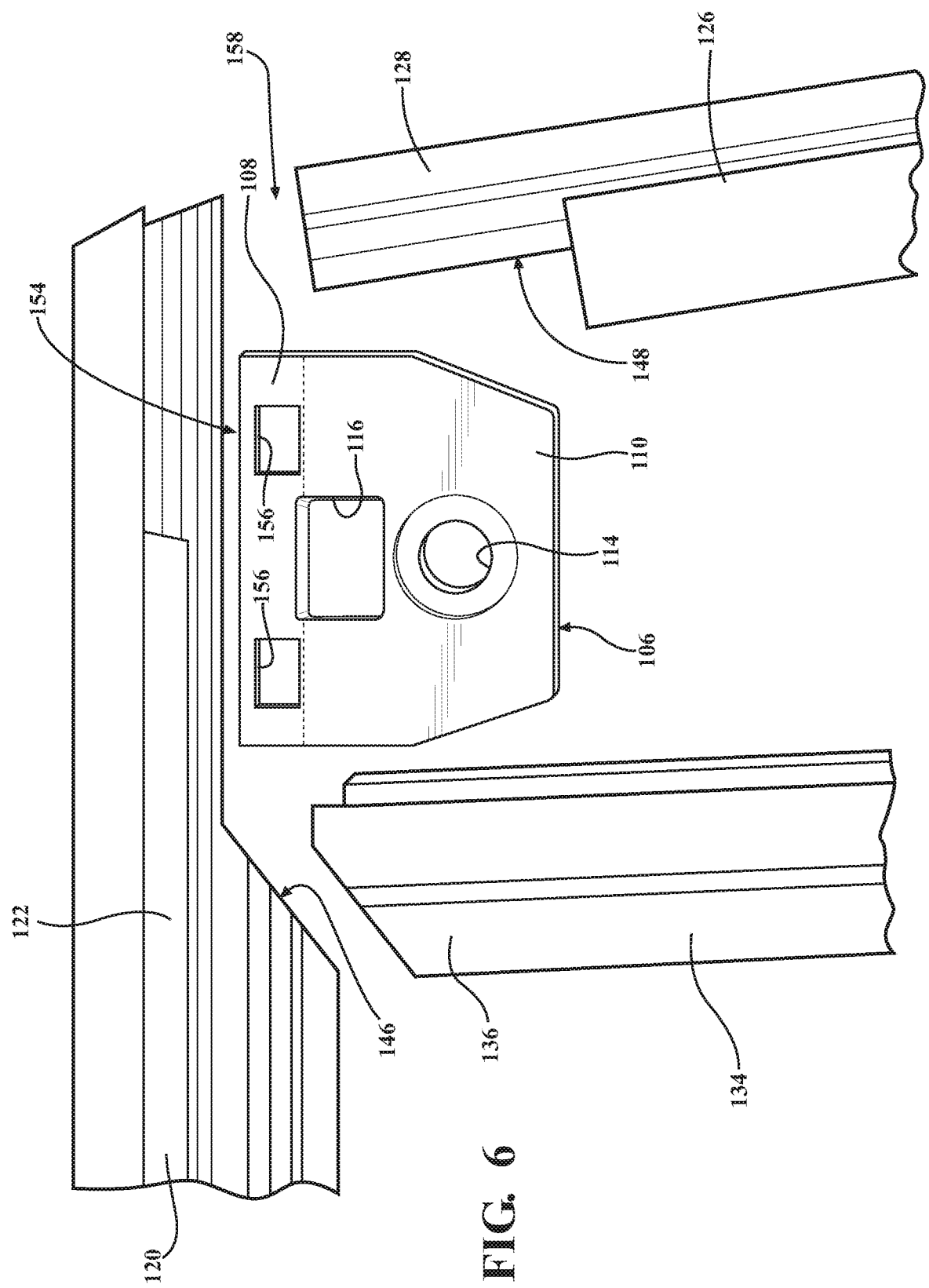
FIG. 6 is an enlarged, back-side view of a portion of the appliqué attachment portion of the seal assembly prior to formation of a corner mold.

As best shown in FIG. 6, the locator device 106 has a foot portion 108 and a tab portion 110 extending from the foot portion 108. The foot 108 and tab 110 portions may have any suitable configuration, and the configuration of the foot 108 and tab 110 portions may be the same or different. In the embodiment shown, the foot portion 108 has a rectangular configuration, and the tab portion 110 has a rectangular configuration with bend sides defining alignment flanges 112. Other configurations of the foot 108 and tab 110 portions may include a square configuration, a triangular configuration, a rounded configuration, and/or the like.

The appliqué 22 is adapted to align and couple with the tab portion 110 of the locator device 106 for mounting the appliqué 22 to the vehicle door 14. For example, the vehicle door 14 may include a fastener, which feeds through an aperture 114 defined in the tab portion 110 of the locator device 106 and is received by a receiver disposed or formed on an interior of the appliqué 22. The tab portion 110 further includes the alignment flanges 112 for aligning or otherwise orienting the appliqué 22 relative to the seal assembly 100 when the appliqué 22 is attached to the vehicle door 14. In an embodiment, the tab portion 110 further includes another aperture 116 for receiving a tab (not shown) coupled to the vehicle 14 for aligning the locator device 106 with the vehicle door 14.

Figure 3:
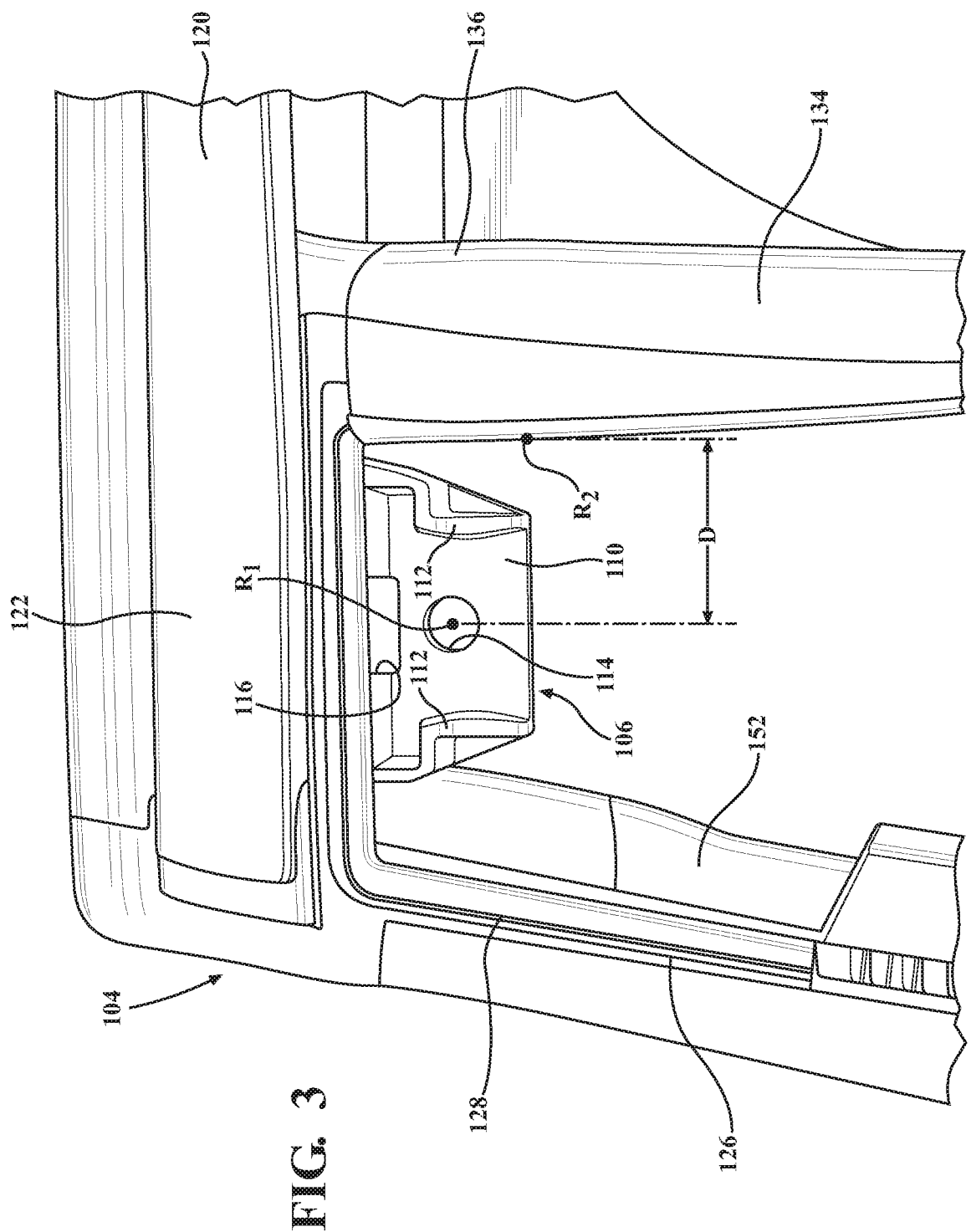
FIG. 3 is an enlarged, front-side view of a portion of an appliqué attachment portion of the seal assembly of FIG. 2.
Figure 4:
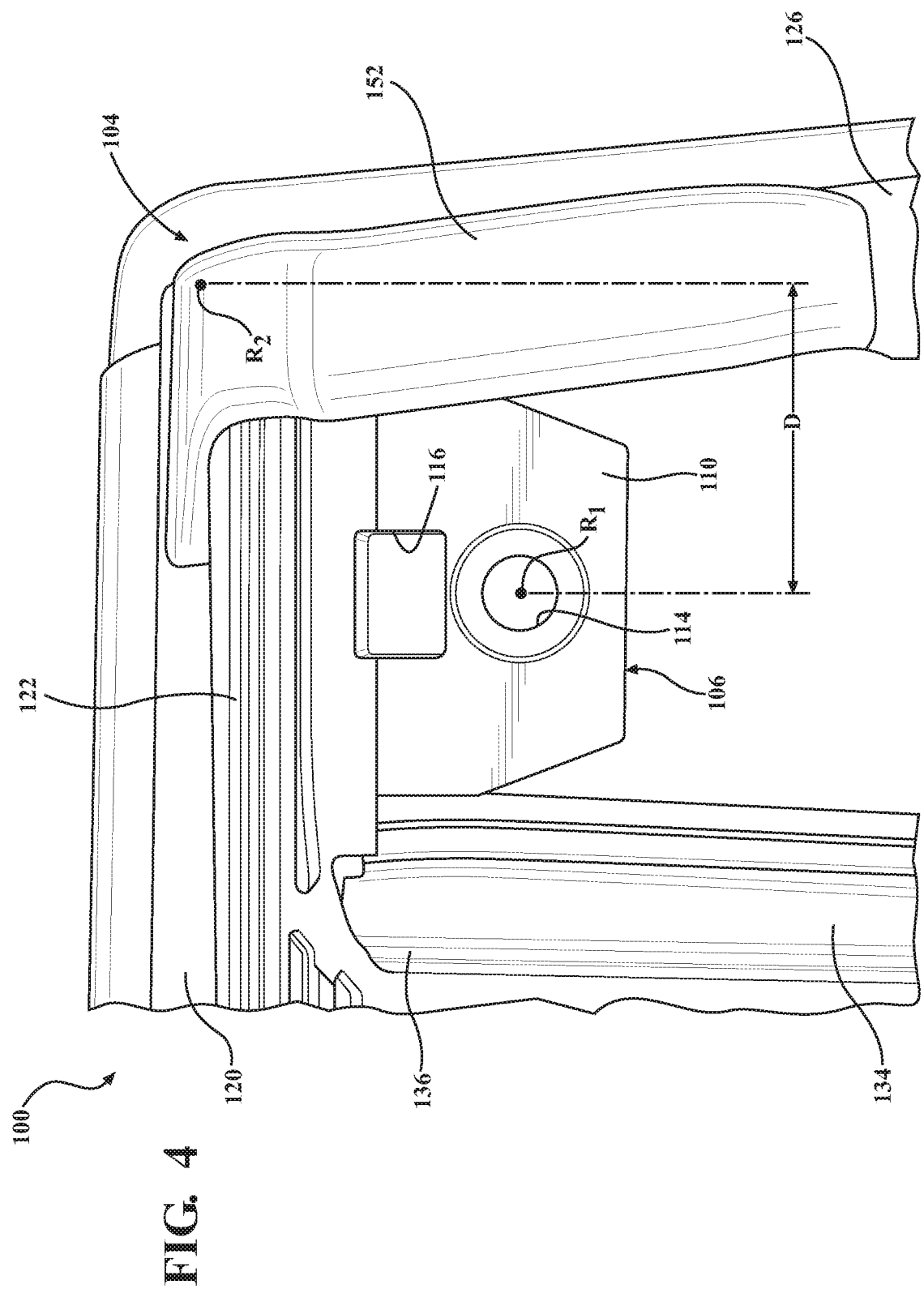
FIG. 4 is an enlarged, back-side view of a portion of the appliqué attachment portion of the seal assembly of FIG. 2.
Figure 5:
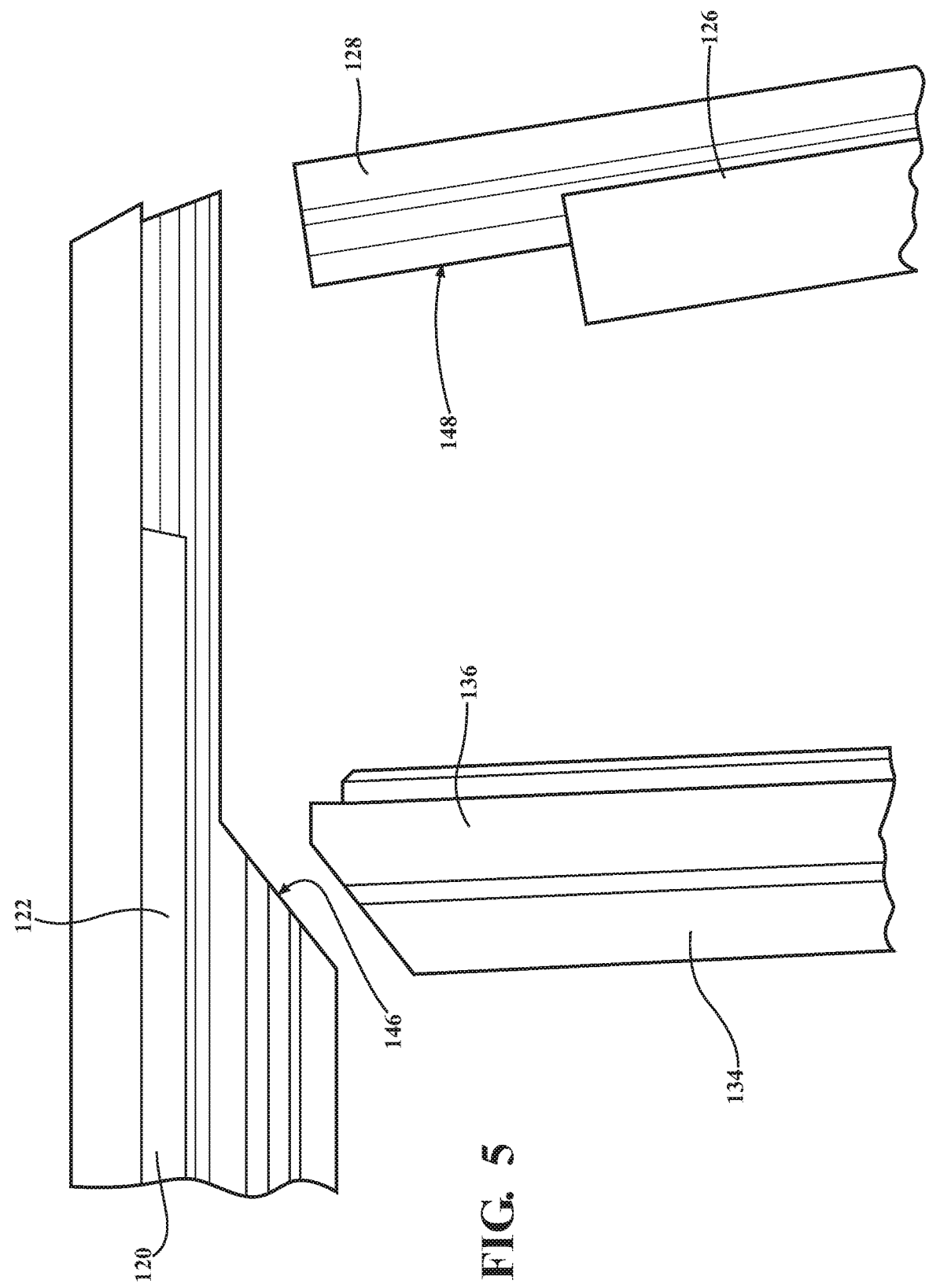
FIG. 5 is an enlarged, back-side view of a portion of the appliqué attachment portion of the seal assembly prior to formation of a locator device.

As best shown in FIG. 2-6, the seal assembly 100 includes a first body 120 formed from an extruded first strip of material having opposing first body ends 122, 124. The seal assembly 100 also includes a second body 134 formed from an extruded second strip of material having opposing second body ends 136, 138. In the embodiment shown in FIG. 2, the seal assembly 100 further includes the first body 120, the second body 134, and a third body 126 formed from an extruded third strip of material having opposing third body ends 128, 130, and a fourth body 142 formed from an extruded fourth strip of material having fourth body ends 144, 146. As shown in FIG. 5, and as described in further detail below, the first body 120 defines a notch 146 at the first body end 122, and the third body 126 defines a notch 148 at the third body end 128.

As shown at least in FIG. 2, the second body end 136 of the second body 134 is positioned adjacent to the first body 120 at the first body end 122. The third body end 128 of the third body 126 is positioned adjacent the first body 120 at the first body end 122 and spaced from the second body 134. The locator device 106 is coupled to the first body 120 between the second 134 and third 126 bodies. Accordingly, a portion of the first body 120, the second body 134, the third body 126, and the locator device 106 form the appliqué attachment portion 104 of the seal assembly 100. As also shown in FIG. 2, the fourth body end 142 of the fourth body 140 is positioned adjacent the first body 120 and spaced from the third body 126. Accordingly, another portion of the first body 120, the third body 126, and the fourth body 140 form the window seal portion 102 of the seal assembly 100.

The seal assembly 100 further includes a fifth body 150 formed or attached to the first body end 124. The fifth body 150 may be an extruded body coupled to the first body end 124 during a molding process, or a body formed separately and attached to the first body end 124 after the seal assembly 100 has been formed.

The foot portion 108 of the locator device 106 is adapted to be mounted at least to the first body 120 of the seal assembly 100. The foot portion 108 of the locator device 106 is positioned adjacent the first body 120 and at least partially within the notch 132. As also discussed below, the seal assembly 100 further includes a corner mold 152, which covers the first body end 122, the second body end 136, the third body end 128, and the foot portion 108 of the locator device 106 and bonds these components together. The corner mold 152 may be formed of any material that will suitably bond the components of the seal assembly 100 together. In an embodiment, the corner mold 152 is formed of a polymeric material that is softer than the elastomeric material of the locator device 106. In an non-limiting example, the corner mold 152 is formed of a thermoplastic elastomeric material. Non-limiting examples of suitable thermoplastic elastomeric materials for the corner mold 118 include a thermoplastic vulcanizate (TPV) material, a styrene-based thermoplastic elastomer (such as a styrene-butadiene thermoplastic elastomer), and combinations thereof.

Although one configuration of the seal assembly 100 has been described above, it is to be understood that the seal assembly 100 could have any configuration, profile, and/or arrangement to suit a particular vehicle configuration or design.

Embodiments of a method of manufacturing the seal assembly 100 are described below with reference to FIGS. 2-8. In these embodiments, the method achieves and maintains proper positioning of the locator device 106 as the seal assembly 100 is being manufactured. By maintaining proper position of the locator device 106, the resultant seal assembly 100 can be properly positioned on the vehicle door 14, and proper positioning of the appliqué 22 (which is coupled to the locator device 106) can be achieved. In addition, with proper positioning of the locator device 106, the window seal portion 102 can be properly aligned to fit within the window frame 16 defined in the vehicle door 14.

The method also maintains proper orientation of the various components of the seal assembly 100. As appreciated by one skilled in the art, slight dimensional variations of the individual components of the seal assembly 100, along with manufacturing process variations, can cause undesirable tolerance stack-up during manufacturing. By maintaining the proper orientation of the components of the seal assembly 100, the method can mitigate this tolerance stack-up.

Figure 7:
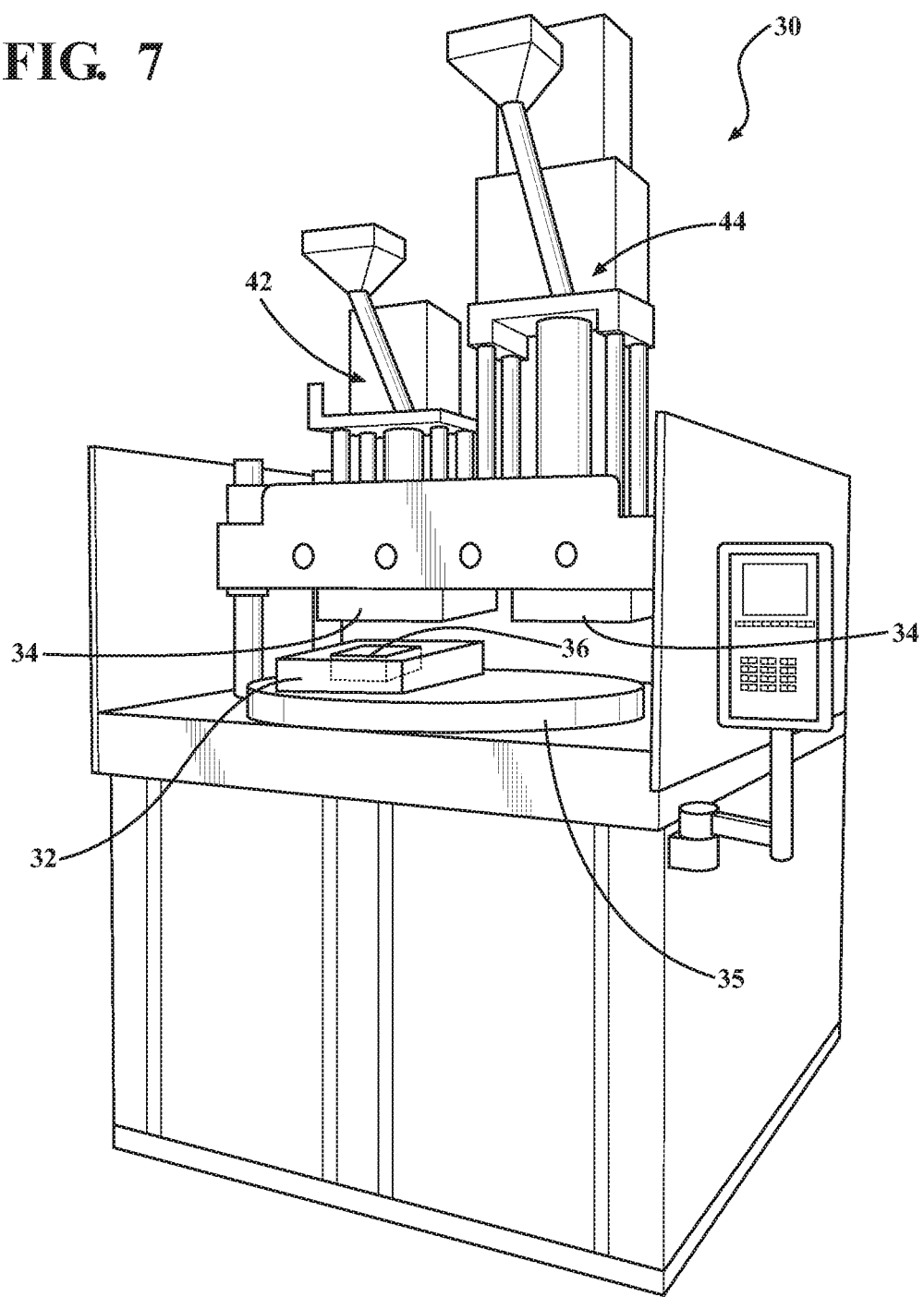
FIG. 7 is a semi-schematic perspective view of a molding apparatus for use in a method of manufacturing the seal assembly according to an embodiment of the present disclosure.

The method utilizes a molding apparatus, such as the molding apparatus 30 semi-schematically illustrated in FIG. 7. The molding apparatus 30 includes a lower die 32 and at least one upper die 34. In an example, the molding apparatus 30 includes two upper dies 34 and a single lower die 32 positioned on a rotating plate 35. The lower die 32 can be rotated from a first positioned (with the lower die 32 aligned with and engaging the first upper die 34 to form a first molding sub-assembly) to a second position (with the lower die 32 aligned with and engaging the second upper die 34 to form a second molding sub-assembly) during formation of the seal assembly 100. The upper die 34 of the first sub-assembly is used to form the locator device 106 during a first injection molding step, while the upper die 34 of the second sub-assembly is used to form the corner mold 118 during a second injection molding step.

Figure 8:
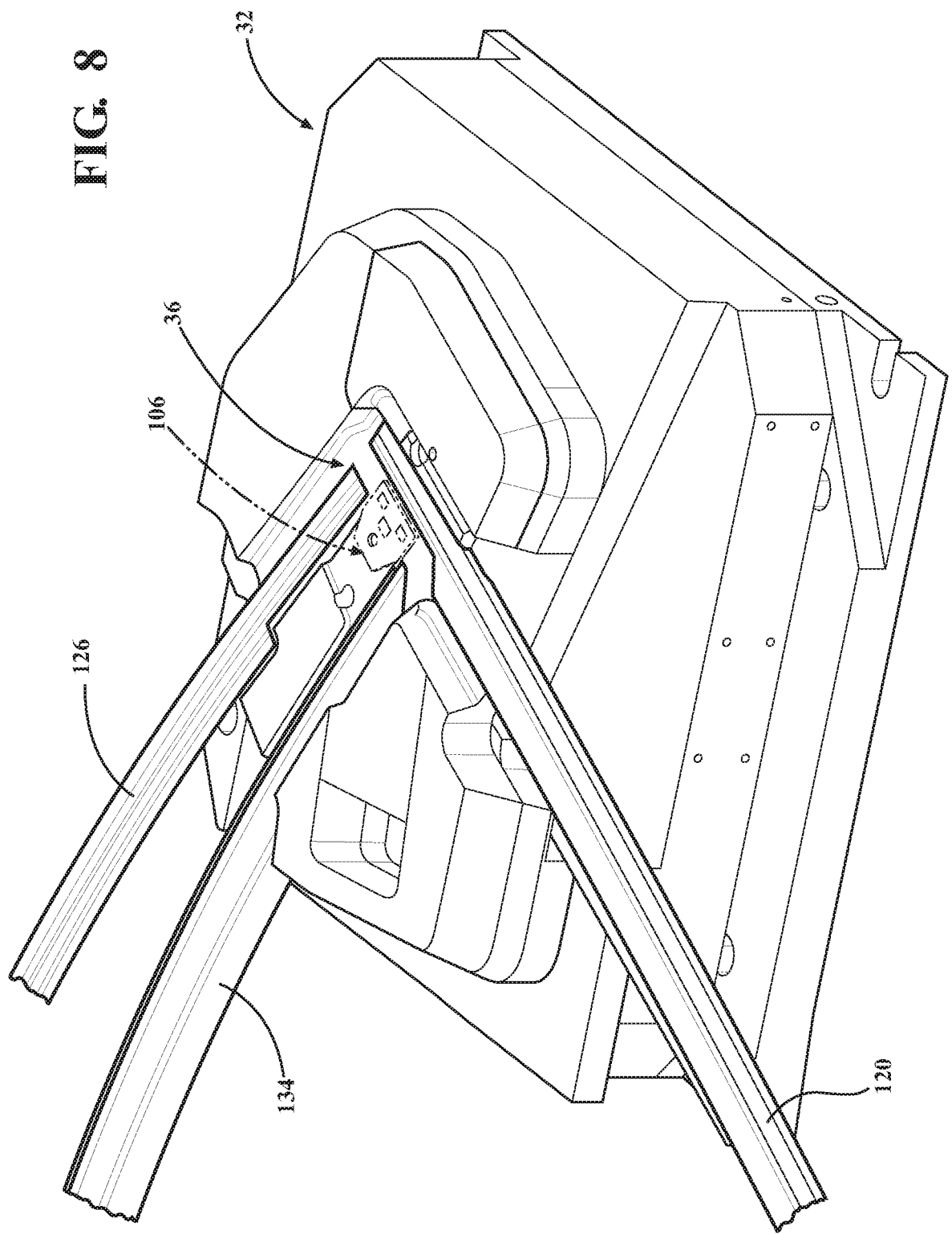
FIG. 8 is a semi-schematic perspective view of a lower die of the molding apparatus with first, second, and third extruded bodies arranged within a mold cavity defined in the die.

The molding apparatus 30 further has a mold cavity 36, which is partially defined in the lower die 32 as shown in FIGS. 7 and 8. The mold cavity 36 is also partially defined in each of the upper dies 34 (not shown). The entire mold cavity 36 of the first sub-assembly is defined by the lower die 32 and the first upper die 34 during the first injection molding step to form the locator device 106. The entire mold cavity 36 of the second sub-assembly is defined by the lower die 32 and the second upper die 34 during the second injection molding step to form the corner mold 152.

The molding apparatus 30 has a first injector, generally indicated at 42, for injecting an elastomeric material into the mold cavity 36 during the first injection molding step to form the locator device 106. The molding apparatus 30 also has a second injector, generally indicated at 44, for injecting a thermoplastic elastomeric material into the mold cavity 36 during the second injection molding step to form the corner mold 152. Typically, the first injector 42 injects the elastomeric material into the first upper die 34 to form the locator device 106, and the second injector 44 injects the thermoplastic elastomeric material into the second upper die 34 to form the corner mold 152. It is to be understood that the injectors 42, 44 operate independently and cooperate to form the locator device 106 and then the corner mold 152. In other words, the injectors 42, 44 operate independently and cooperate to form the locator device 106 first and the corner mold 152 second.

The method of manufacturing the seal assembly 100 includes the steps of extruding the first strip of material to form the first body 120 having the opposing first body ends 122, 124, and extruding the second strip of material to form the second body 134 having the opposing second body ends 136, 138. Extruding may be accomplished using any suitable extruding process and equipment as known by one skilled in the art.

In an embodiment, the first body 120 may be formed by extruding a first strip of an elastomeric material, and the second body 134 may be formed by extruding a second strip of an elastomeric material. The elastomeric material of each of the first and second strips of material may be an ethylene propylene diene monomer (EPDM), such as EPDM rubber. In one example, the elastomeric material may be only EPDM. In another example, the elastomeric material includes the EPDM with additional components and/or additives, such as a plasticizer, a filler, etc. In an alternative embodiment, the elastomeric material may be chosen from an elastomeric material other than EPDM, such as styrene butadiene rubber (SBR), natural rubber, neoprene and/or combinations thereof. In addition, the elastomeric material of the first strip of material may be the same or different from the elastomeric material of the second strip of material. In an embodiment, one or more of the first 120 and second 134 bodies could also support a metal carrier or other reinforcing material.

Once the first and second strips of materials have been extruded, the method includes the step of positioning one of the first body ends 122, 124 and one of the second body ends 136, 138 into the mold cavity 36 of the molding apparatus 30. As shown in FIGS. 5 and 8, the first body end 122 may be positioned adjacent to, but spaced from the second body end 136 inside the mold cavity 36. More particularly, the first body end 122 is positioned in a first predetermined orientation and the second body end 136 is positioned in a second predetermined orientation transverse to the first predetermined orientation. With this orientation, the first body 120 forms a base and the second body 134 forms a side of the appliqué attachment portion 104.

As previously mentioned, and as shown in FIG. 5, the first body end 122 includes the notch 146. The notch 146 is typically formed after the first 120 and second 134 bodies are formed, and prior to positioning the first 120 and second 134 bodies in the mold cavity 26 of the molding apparatus 30. The notch 146 may have any configuration. In the embodiment shown, a portion of the notch 146 is defined by a tapered surface and another portion of the notch 146 is defined by a horizontal surface. As shown in FIG. 5, the second body end 136 has tapered surface complementary to the tapered surface of the notch 146. When positioned within the mold cavity 36, and as shown in FIG. 8, the second body end 136 is positioned adjacent the first body end 122 such that the tapered surface of the second body 134 is positioned adjacent to the tapered surface of the notch 146.

Once at least the first 122 and second 128 body ends have been positioned within the mold cavity 36, the method further includes the step of injecting an elastomeric material into the mold cavity 36 of the molding apparatus 30 to form the locator device 106. It is to be appreciated that additional body ends also may be positioned within the mold cavity 36 prior to injecting the material as discussed below. In an embodiment, the lower die 32 defines a mold for the locator device 106 in the mold cavity 36, generally shown in phantom lines in FIG. 8. The elastomeric material is injected into the mold cavity 36 utilizing the first injector 42 of the molding apparatus 30. In an embodiment, and with the lower die 32 aligned with the first upper die 34 of the molding apparatus 30 and forming the first sub-assembly, the elastomeric material is injected into a portion of the mold cavity 36 defined in the first upper die 34 to form the locator device 106. This is also shown in FIG. 6.

The injected elastomeric material forms the locator device 106 including the foot portion 108 and the tab portion 110. Typically, the foot portion 108 is integral with the tab portion 110. In addition, the foot portion 108 is positioned adjacent the first body end 122 (such as adjacent to the horizontal surface of the notch 146) with a space 154 between the foot portion 108 and the first body 120. In other words, the foot portion 108 of the locator device 106 is spaced from the first body 120 when the locator device 106 is formed. In addition, when formed, the tab portion 110 extends from the foot portion 108 a direction away from the first body end 122 and in a direction substantially parallel to the second body end 136. In addition, the tab portion 110 is positioned adjacent to both of the first 122 and second 128 body ends.

The tab portion 110 of the locator device 106 defines a first reference point $R_1$. The first reference point $R_1$ may be defined anywhere on the tab portion 110 of the locator device 106. In an embodiment, and as illustrated, the first reference point $R_1$ is defined at the center of the aperture 114 defined in the tab portion 110 of the locator device 106.

The method further includes the step of injecting the thermoplastic elastomeric material into the mold cavity 36 to form the corner mold 152 covering the first body end 122, the second body end 136, and the foot portion 108 of the locator device 106. Again, as mentioned below, additional body ends may be disposed in the mold cavity and covered by the corner mold. The thermoplastic elastomeric material is injected utilizing the second injector 44 of the molding apparatus 30. In an example, once the locator device 106 is formed during the prior injection step, the rotating plate 35 rotates to move the lower die 32 (including the first 122 and second 128 body ends and the newly formed locator device 106 inside the portion of the mold cavity 36 defined in the lower die 32) toward the second upper die 34. Once the lower die 32 is aligned with and engages the second upper die 34, the thermoplastic elastomeric material is injected, utilizing the second injector 44, directly into a portion of the mold cavity 36 defined in the second upper die 34 to form the corner mold 152.

This step of injecting the thermoplastic elastomeric material into the mold cavity 36 occurs after the step of injecting the elastomeric material into the mold cavity 36 to form the locator device 106. Accordingly, the locator device 106 is formed before the thermoplastic elastomeric material is injected into the mold cavity 36 so that the thermoplastic elastomeric material forms the corner mold 152 which bonds the foot portion 108 of the locator device 106 to the first body end 122. In addition, the first 122 and second 128 body ends remain in the mold cavity 36 of the molding apparatus 30 during the step of injecting the thermoplastic elastomeric material such that the thermoplastic elastomeric material forms the corner mold 152 which bonds the first body end 122 and the second body end 136 to one another.

As shown in FIG. 5, the foot portion 108 of the locator device 106 defines at least one aperture 156. When the corner mold 152 is formed, the molten thermoplastic elastomeric material flows over the foot portion 108 and into the aperture(s) 156. The molten thermoplastic elastomeric material also flows into the space 154 between the foot portion 108 of the locator device 106 and the first body 120. In this way, the apertures 156 defined in the foot portion 108, as well as the space 154 between the foot portion 108 and the first body 120 are filled with the thermoplastic elastomeric material of the corner mold 118, thereby interlocking the locator device 106 with the first body 120.

Additionally, and as shown in FIG. 5, the first 122 and second 128 body ends are spaced from one another when positioned in the mold cavity 36. When the corner mold 152 is formed, the molten thermoplastic material flows over the first body end 122 and the second body end 134 and into another space 158 between the first 122 and second 128 body ends to form a joint. In this way, the thermoplastic elastomeric material of the corner mold 152 bonds the first 122 and second 128 body ends together. In an embodiment, the corner mold 152 bonds the first body end 122 of the first body 120, the second body end 136 of the second body 134, and the foot portion 108 of the locator device 106 together. Accordingly, the corner mold 152 fixes or mounts the locator device 106 to the first body 120 of the seal assembly 100.

The corner mold 152 further defines a second reference point $R_2$. The second reference point $R_2$ can be defined anywhere on the corner mold 152. In one embodiment, and as shown in FIG. 4, the second reference point $R_2$ is defined at a corner of the corner mold 152 formed over the first 122 and second 128 body ends. In another embodiment, and as shown in FIG. 3, the second reference point $R_2$ is defined on a portion of the corner mold 152 covering the second body 134. In other words, the second reference point $R_2$ is defined on the corner mold 152 adjacent the second body 134.

Proper orientation of the first body 120, the second body 134, and the locator device 106 is accomplished by maintaining a predetermined distance D between the first and second reference points $R_1$, $R_2$. For example, and as shown in FIG. 4, the position of the locator device 106 (i.e., the locator position) may be maintained during the second injection step by maintaining the predetermined distance D measured between the first reference point $R_1$ defined by the tab portion 110 of the locator device 106 and the second reference point $R_2$ defined about the corner of the corner mold 118. In another example, and as shown in FIG. 3, the locator position may be maintained during the second injection step by maintaining the predetermined distance D between the first reference point $R_1$ defined by the tab portion 110 of the locator device 106 and the second reference point $R_2$ defined by the portion of the corner mold 118 covering the second body 134. Typically, the predetermined distance D between the first and second reference points $R_1$, $R_2$ is maintained throughout the entire step of injecting the thermoplastic elastomeric material into the mold cavity 36 of the molding apparatus 30.

As previously mentioned, maintaining proper positioning and orientation of the locator device 106 during manufacture, which is accomplished by maintaining the predetermined distance D between the two reference points $R_1$, $R_2$, ensures proper positioning of the locator device 106 so that the appliqué 22, which is subsequently attached to the locator device 106, is aligned. Maintaining proper positioning and orientation of the locator device 106 also ensure proper positioning of the seal assembly 100 such that the window seal portion 102 within the window frame 16 defined in the vehicle door 14.

In addition, the components of the seal assembly 100 (for example, the first body end 122 and the second body end 136) remain inside the mold cavity 36 between the formation of the locator device 106 and the corner mold 152. To this end, the components are not moved between the first and second injection steps, which contributes to maintaining proper geometric alignment of the components and improves tolerances during manufacture of the seal assembly 100.

In the embodiment described above, the method is described as forming the first 120 and second 134 bodies and the locator device 106 of the seal assembly 100. In another embodiment, the method can be used to form the first body 120, the second body 134, and the third body 126. For example, the method may further include extruding a third strip of material to form the third body 126 having opposing third body ends 128, 130. The method further includes positioning the third body end 136 into the mold cavity 36 adjacent the first body end 122 and spaced from the second body end 136 (as also shown in FIG. 8). In an embodiment, the step of positioning the third body end 128 into the mold cavity 36 occurs simultaneously with the step of positioning the first 122 and second 128 body ends into the mold cavity 36. In an example, the third body end 128 is positioned in the mold cavity 36 in a third predetermined orientation transverse to the first predetermined orientation of the first body end 122. In addition, the third body end 128 may be positioned adjacent to, but spaced from the notch 146 defined in the first body end 122.

Once the first 122, second 136, and third 128 body ends have been positioned within the mold cavity 36, the method includes injecting the elastomeric material into the mold cavity 36 to form the locator device 106. In this embodiment, the foot portion 108 of the locator device 106 is formed within, but spaced from the notch 146 and between the second 136 and third 128 body ends. With the first 122, second 136, and third 128 body ends remaining inside the mold cavity 36, the method further includes injecting the thermoplastic elastomeric material into the mold cavity 36 to form the corner mold 152. The corner mold 152 covers the first body end 122, the second body end 136, and the third body end 128 (including the notch 148). Accordingly, the first body 120 forms a base, the second body 134 forms a side, and the third body 126 forms another side of the appliqué attachment portion 104.

In an embodiment, the method further includes the step of attaching the appliqué 22 to the locator device 106 such that the appliqué 22 is positioned between the second 134 and third 126 bodies of the appliqué attachment portion 104 of the seal assembly 100. The appliqué 22 may be attached utilizing the fastening means as previously described.

It is contemplated that a fourth body 140 of the seal assembly 100 can be formed at the same time as the first 120 and second 134 bodies. For this embodiment, the method may include extruding a fourth strip of material to form the fourth body 140 having opposing fourth body ends 142, 144. The method further includes positioning the fourth body end 142 into a mold cavity adjacent the first body end 124 and spaced from the second body end 136. In an example, the spacing between the fourth body end 140 and the second body end 136 is substantially the same as a length of the window frame 16, which extends along a longitudinal axis A of the vehicle 10. In an embodiment, the step of positioning the fourth body end 142 into a mold cavity occurs simultaneously with the step of positioning the first 122, second 136, and third 128 body ends into the mold cavity 36. The mold cavity receiving the fourth body end 142 may or may not be the same mold cavity receiving the second 136 and third 128 body ends.

In an example, the fourth body end 142 is positioned in a mold cavity in a fourth predetermined orientation transverse to the first predetermined orientation of the first body end 122. In addition, the fourth body end 142 may be positioned adjacent to or at least partially within a notch (not shown) defined in the first body end 124, such that the notch receives and/or aligns the fourth body end 142.

Once the first 122, second 128, third 128, and fourth 142 body ends have been positioned within one or more the mold cavities, the method includes injecting the elastomeric material into the mold cavity 36 to form the locator device 106. In this embodiment, the foot portion 108 of the locator device 106 is formed within the notch 146 and between the second 136 and third 128 body ends.

With the first 122, second 136, third 128, and fourth 142 body ends remaining inside one or more mold cavities, the method further includes injecting the thermoplastic elastomeric material into the mold cavity 36 to form the corner mold 152. The corner mold 152 covers the first body end 122, the second body end 136, the third body end 128, and the foot portion 108 of the locator device 106 to form the appliqué attachment portion 104 of the seal assembly 100. In addition, a portion of the first body end 122, the second body end 136 and the fourth body end 142 form the window seal portion 102 of the seal assembly 100. Accordingly, the first body 120 forms a base, the second body 134 forms a side, and the fourth body 140 forms another side of the window seal assembly 102.

While the embodiment above has been described as forming the fourth body 140 at the same time as forming the first 120, second 134, and third 126 bodies, it is contemplated that attachment of the first body end 122 and the fourth body end 142 can be accomplished in a separate process.

While the invention has been described with reference to the examples above, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all examples falling within the scope of the appended claims.

What is claimed is:

1. A method of manufacturing a seal assembly for a vehicle with said method utilizing a molding apparatus defining a mold cavity, said method comprising the steps of:
   extruding a first strip of material to form a first body having opposing first body ends;
   extruding a second strip of material to form a second body having opposing second body ends;
   positioning one of the first body ends and one of the second body ends into the mold cavity of the molding apparatus with the first body end positioned adjacent the second body end;
   injecting an elastomeric material into the mold cavity to form a locator device having a foot portion and a tab portion extending from the foot portion with the tab portion defining a first reference point and with the foot portion of the locator device positioned adjacent the first body end; and
   injecting a thermoplastic elastomeric material into the mold cavity to form a corner mold covering the first body end, the second body end, and the foot portion of the locator device with the corner mold defining a second reference point, and the corner mold bonding the first body end, the second body end, and the locator device together and to fix the foot portion of the locator device to the first body end at a locator position such that a predetermined distance between the first and second reference points is maintained during the injecting of the thermoplastic elastomeric material.

2. The method as set forth in claim 1 wherein the tab portion of the locator device has an aperture and the second reference point is defined at the center of the aperture.

3. The method as set forth in claim 1 wherein the corner mold has a corner with the second reference point defined on the corner and the locator position is maintained during the injecting of the thermoplastic elastomeric material by maintaining the predetermined distance between the first reference point defined on the tab portion of the locator device and the second reference point defined on the corner of the corner mold.

4. The method as set forth in claim 1 wherein the second reference point is defined on a portion of the corner mold covering the second body and the locator position is maintained during the injecting of the thermoplastic elastomeric material by maintaining the predetermined distance between the first reference point defined on the tab portion of the locator device and the second reference point defined on the portion of the corner mold covering the second body.

5. The method as set forth in claim 1 wherein the foot portion of the locator device defines at least one aperture and is spaced from the first body and during the step of injecting the thermoplastic elastomeric material into the mold cavity to form the corner mold, the thermoplastic elastomeric material flows into the aperture defined in the foot portion of the locator device and into a space between the foot portion and the first body end to interlock the locator device with the first body end.

6. The method as set forth in claim 1 wherein the step of positioning the first and second body ends in the mold cavity is further defined as positioning the first body end in a first predetermined orientation in the mold cavity and positioning the second body end in a second predetermined orientation in the mold cavity transverse to the first predetermined orientation such that the first body forms a base and the second body forms a side of an applique attachment portion of the seal assembly.

7. The method as set forth in claim 1 further comprising the steps of:
   extruding a third strip of material to form a third body having opposing third body ends; and
   positioning one of the third body ends into the mold cavity of the molding apparatus in a third predetermined orientation transverse to the first predetermined orientation; and
   wherein the step of injecting the thermoplastic elastomeric material further comprises injecting the thermoplastic elastomeric material into the mold cavity to form the corner mold covering the first body end, the second body end, and the third body end such that that the first body forms a base, the second body forms a side, and the third body forms another side of an appliqué attachment portion of the seal assembly.

8. The method as set forth in claim 7 wherein the step of positioning the third body end into the mold cavity occurs simultaneously with the step of positioning the first and second body ends into the mold cavity.

9. The method as set forth in claim 7 further comprising the step of attaching an appliqué the locator device such that the appliqué is positioned between the second and third bodies of the appliqué attachment portion of the seal assembly.

10. The method as set forth in claim 9 wherein the locator device defines at least one alignment flange and the step of attaching the appliqué comprises utilizing the alignment flange to orient the appliqué relative to the seal assembly.

11. The method as set forth in claim 7 wherein the first and second bodies partially form a window seal portion for attachment to a window frame of the vehicle.

12. The method as set forth in claim 1 wherein the step of injecting the thermoplastic elastomeric material into the mold cavity to form the corner mold occurs after to the step of injecting the elastomeric material into the mold cavity to form the locator device.

13. The method as set forth in claim 1 wherein the first and second bodies remain in the mold cavity during the steps of injecting the elastomeric material into the mold cavity to form the locator device and injecting the thermoplastic elastomeric material into the mold cavity to form the corner mold.

14. The method as set forth in claim 1 wherein the molding apparatus has a lower die defining a lower portion of the mold cavity and the step of positioning one of the first body ends and one of the second body ends in the mold cavity is further defined as positioning one of the first body ends and one of the second body ends in the lower portion of the mold cavity.

15. The method as set forth in claim 1 wherein the molding apparatus has a lower die, a first upper die, and a second upper die and the step of injecting the elastomeric material comprises injecting the elastomeric material into the first upper die and the step of injecting the thermoplastic elastomeric material into the mold cavity comprises injecting the thermoplastic elastomeric material into the second upper die.

16. The method as set forth in claim 15 wherein step of injecting the elastomeric material into the first upper die occurs prior to the step of injecting the thermoplastic elastomeric material into the second upper die.

17. The method as set forth in claim 1 wherein the step of injecting the elastomeric material is further defined as injecting the elastomeric material utilizing a first injector, and the step of injecting the thermoplastic elastomeric material is further defined as injecting the thermoplastic elastomeric material utilizing a second injector.

* * * * *